US012231894B2

United States Patent
Rajadurai et al.

(10) Patent No.: US 12,231,894 B2
(45) Date of Patent: *Feb. 18, 2025

(54) METHOD AND DEVICE FOR PROTECTING SENSITIVE USER PLANE TRAFFIC

(71) Applicant: Samsung Electronics Co., Ltd., Suwon-si (KR)

(72) Inventors: Rajavelsamy Rajadurai, Bangalore (IN); Kundan Tiwari, Bangalore (IN); Varini Gupta, Bangalore (IN); Anikethan Ramakrishna Vijaya Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,242

(22) Filed: Dec. 14, 2023

(65) Prior Publication Data

US 2024/0129738 A1    Apr. 18, 2024

Related U.S. Application Data

(63) Continuation of application No. 17/911,830, filed as application No. PCT/KR2021/005518 on Apr. 30, 2021, now Pat. No. 11,882,451.

(30) Foreign Application Priority Data

Apr. 30, 2020    (IN) .............................. 202041018540
Apr. 28, 2021    (IN) ............................ 2020 41018540

(51) Int. Cl.
*H04W 12/10*    (2021.01)
*H04W 12/033*    (2021.01)
(Continued)

(52) U.S. Cl.
CPC ....... *H04W 12/106* (2021.01); *H04W 12/033* (2021.01); *H04W 12/069* (2021.01)

(58) Field of Classification Search
CPC ............ H04W 12/033; H04W 12/069; H04W 12/106
See application file for complete search history.

(56) References Cited

U.S. PATENT DOCUMENTS 10,681,072 B2 *    6/2020    Alfano ................. H04L 63/1408
11,832,122 B2 *    11/2023    Jung ..................... H04L 41/147
(Continued)

FOREIGN PATENT DOCUMENTS

KR    10-2020-0043459 A    4/2020
WO    2020/027632 A1    2/2020

OTHER PUBLICATIONS

Korean Decision on Grant dated Mar. 5, 2024, issued in Korean Application No. 10-2022-7041878.
(Continued)

*Primary Examiner* — William S Powers
(74) *Attorney, Agent, or Firm* — Jefferson IP Law, LLP

(57) ABSTRACT

Disclosed herein are a communication technique for merging, with an IoT technology, a 5G communication system for supporting a data transmission rate higher than that of a 4G system; and a system therefor.
Embodiments herein disclose a method of protecting sensitive user plane traffic in an User Equipment (UE) (100), the method comprising: transmitting, to a network (200), by the UE (100) a first NAS message comprising an indicator indicating that the UE (200) supports of a secure channel for domain name system (DNS); receiving, from the network (200), by the UE (100) a second NAS message including DNS server security information in response to transmitting the first NAS message; and transmitting, to the network
(Continued)

(200), by the UE (100) the DNS over the secure channel based on the DNS server security information.

16 Claims, 5 Drawing Sheets

(51) Int. Cl.
*H04W 12/069* (2021.01)
*H04W 12/106* (2021.01)

(56) References Cited

U.S. PATENT DOCUMENTS

| | | | | |
|---|---|---|---|---|
| 2005/0182957 | A1* | 8/2005 | Della-Libera | G06F 21/60 |
| | | | | 726/1 |
| 2009/0049526 | A1* | 2/2009 | Zhang | H04W 8/04 |
| | | | | 726/4 |
| 2017/0318463 | A1 | 11/2017 | Lee et al. | |
| 2020/0037165 | A1* | 1/2020 | Kunz | H04W 12/106 |
| 2020/0068587 | A1* | 2/2020 | Garcia Azorero | H04W 76/10 |
| 2020/0259853 | A1 | 8/2020 | Alfano et al. | |
| 2021/0168584 | A1* | 6/2021 | Li | H04W 48/20 |

OTHER PUBLICATIONS

European Search Report dated Sep. 20, 2023, issued in European Application No. 21795914.7.

Indian Examination report dated Feb. 24, 2023, issued in Indian Application No. 202041018540.

Qualcomm Incorporated et al., 'Proposed solution for UP IP issues in GSMA LS', S3-200767, 3GPP TSG-SA3 Meeting #98Bis-e, Apr. 3, 2020, section 3.

'3GPP; TSG SA; Technical report on key issues and potential solutions for Integrity protection of the User Plane; (Release 16)', 3GPP TR 33.853 V0.7.0, Jan. 2, 2020, sections 5.5-5.5.4, 6.1-6.1.4, 6.5-6.5.4, 6.7-6.7.4; and figures 6.1.3-1, 6.7.3.1.1.

Vodafone, 'Corrections to Key Issue 5', S3-200639, 3GPP TSG-SA3 Meeting #98Bis-e, Apr. 3, 2020, sections 5.5-5.5.4.

* cited by examiner

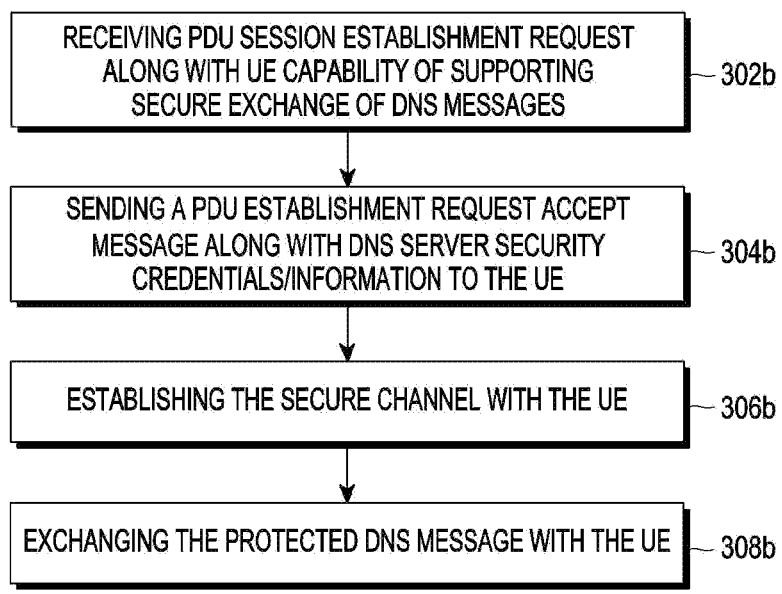

METHOD AND DEVICE FOR PROTECTING SENSITIVE USER PLANE TRAFFIC

CROSS-REFERENCE TO RELATED APPLICATION(S)

This application is a continuation application of prior application Ser. No. 17/911,830, filed on Sep. 15, 2022, which is a U.S. National Stage application under 35 U.S.C. § 371 of an International application number PCT/KR2021/005518, filed on Apr. 30, 2021, which is based on and claims priority of an Indian provisional application number 202041018540, filed on Apr. 30, 2020, in the Indian Intellectual Property Office, and of an Indian complete application number 202041018540, filed on Apr. 28, 2021, in the Indian Intellectual Property Office, the disclosure of each of which is incorporated by reference herein in its entirety.

TECHNICAL FIELD

The present disclosure relates to wireless communication protection and more specifically relates to method and device for protection of user plane traffic.

BACKGROUND ART

In order to meet the demand for wireless data traffic soring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation. There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a Big data processing technique may be said to be an example of the convergence of the 5G and IoT technologies.

In general, in a wireless communication network only encryption is enabled and integrity protection is not enabled for a long-term evolution data radio bearers (LTE DRBs) (user plane) (UP) so as to reduce computation power and/or considering a User Equipment (UE) capability or based on a requested application/service on the UE. Absence of integrity protection unwraps security attack like manipulation of an encrypted text by a Man in the Middle (MitM) between a user equipment (UE) and an evolved Node B/a next-generation radio access technology network Node B (eNB/gNB). Manipulation of the encrypted text is a serious threat particularly for signaling messages leading to redirection attacks. For example, redirection of a domain name system (DNS) query message. Further, the attack can be performed by manipulation of a DNS server internet protocol (IP) address of a DNS request message from the UE, so that the DNS request is redirected to a malicious DNS server under an attacker's control rather than intended destination. Therefore, it is required to the integrity protection the signaling messages over the user plane.

3GPP system supports UP IP at Packet Data Convergence Protocol (PDCP) layer (PDCP is located in the Radio Protocol Stack), however, it has been identified that applying UP IP on the whole Packet Data Unit (PDU) session at PDCP layer just for the protection DNS traffic is wasteful of resources. As the 5G system allows enabling and disabling of the integrity protection and/or confidentiality protection of the user plane on per Packet Data Unit (PDU) session basis. Applying protection to all types ( ) of data traffic within a PDU session is not effective; as not all data traffic types require protection. Therefore, in order to avoid such a wasteful situation (avoid utilizing the UP IP at PDCP layer), other approaches to protect the DNS traffic to be considered.

Hence it is necessary to provide integrity protection to the DNS packets via a different channel in order to avoid redirection attack.

DISCLOSURE OF INVENTION

Technical Problem

The principal object of the embodiments herein is to provide a method for configuring the DNS credentials in an UE by a network system during Registration procedure using Non-Access Stratum NAS message(s) which carries new Information Element (IE)/Container.

Another object of the embodiments herein is to provide a method for configuring the DNS credentials in the UE by the network system during Service Request procedure, using the NAS message(s) which carries new Information Element (IE)/Container.

Another object of the embodiments herein is to provide a method for configuring the DNS credentials in the UE by the network system during a Protocol Data Unit (PDU) session establishment procedure, using the NAS message(s) which carries new Information Element (IE)/Container.

Another object of the embodiments herein is to inform the network system that the UE supports secure exchange of DNS message using DNS configuration parameters provided by the network system.

Another object of the embodiments herein is to provide a method and device for configuring a UE Route Selection Policy (URSP) to carry special DNN for User Plane Internet Protocol (UP IP) of special traffic based on a network security policy on UP IP.

Solution to Problem

Accordingly, the embodiments herein provide a method of protecting sensitive user plane traffic in the UE. The method comprises transmitting, to a network by the UE, a first NAS message including an indicator indicating that the UE supports of a secure channel for data network system (DNS); receiving, from the network entity by the UE, a second NAS message including DNS server security information in response to transmitting the first NAS message; and transmitting, to the network by the UE, the DNS over the secure channel based on the DNS server security information.

In an embodiment, the first NAS message comprises one of a protocol data unit (PDU) session establishment request message, a registration request message, or a service request message.

In an embodiment, the second NAS message comprises one of a PDU session establishment accept message, a registration accept message, or a service accept message.

In an embodiment, the secure channel comprises one of DNS over datagram transport layer security (DTLS), DNS over transport layer security (TLS), or DNS over hypertext transfer protocol secure (HTTPS).

In another embodiment, the indicator is included in protocol configuration options in the first NAS message.

In yet another embodiment, the DNS server security information is included in protocol configuration options in the second NAS message.

In an embodiment, the DNS server security information comprises at least one of information on a security mechanism, information on a service port, information on an authentication domain name, information on subject public key (SPKI), information on root certificate, information on a raw public key and a root certificate.

Accordingly the embodiments herein provides a method of the network. The method comprising receiving, from the UE by the network, a first NAS message including an indicator indicating that the UE supports a secure channel for domain name system (DNS); transmitting, to the UE from the network, a second NAS message including DNS server security information in response to transmitting the first NAS message; and receiving, from the UE by the network, the DNS over the secure channel based on the DNS server security information.

Accordingly the embodiments herein provides the network. The network comprising, a memory, a processor, a transceiver, and wherein the processor is configured to receive, from the UE by the network, a first NAS message including an indicator indicating that the UE supports a secure channel for domain name system (DNS); transmit, to the UE from the network, a second NAS message including DNS server security information in response to transmitting the first NAS message; and receive, from the UE by the network, the DNS over the secure channel based on the DNS server security information.

Accordingly, the embodiments herein provide the UE. The UE comprising, a memory, a processor, a transceiver, and wherein the processor is configured to transmit, to a network by the UE, a first NAS message comprising an indicator indicating that the UE supports of a secure channel for domain name system (DNS); receive, from the network, by the UE, a second NAS message including DNS server security information in response to transmitting the first NAS message; and transmit, to the network, by the UE, the DNS over the secure channel based on the DNS server security information.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This method and the device illustrated in the accompanying drawings, throughout which reference letters indicate corresponding parts in the various figures. The embodiments herein will be better understood from the following description with reference to the drawings, in which:

FIG. 3B is a flow diagram, illustrating a method of user plane traffic protection from the network system perspective, according to an embodiment as disclosed herein;

FIG. 4 is a schematic diagram, illustrating an example of a container for storing DNS configuration parameters, according to an embodiment as disclosed herein;

MODE FOR THE INVENTION

Figure 1A:
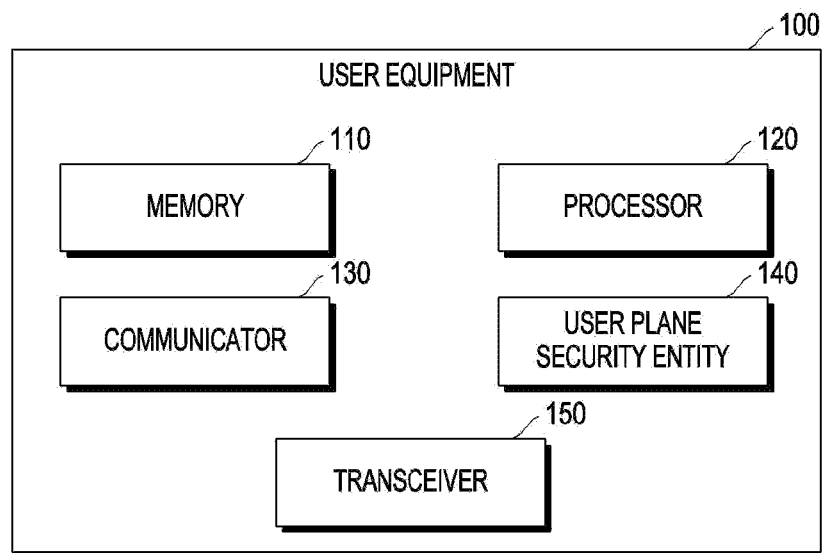
FIG. 1A illustrates a block diagram of an UE for protecting user plane (UP) traffic, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method and device for configuring a DNS server or a DNS service information or DNS credentials in the UE by a network system. The present method provides protection of the UP traffic (DNS messages) at the application layer. By applying the protection at the application layer for DNS message exchanges instead of applying protection at the PDCP layer, will reduce the resource consumption by not protection all the data traffic of a PDU session.

In an embodiment the UE determines its capability of supporting a secure exchange of DNS message if DNS configuration parameters are received from the network system. The UE then informs the network system about the secure exchange of the DNS message capability through a Non-Access Stratum (NAS) message by including DNS server security information indicator. The network system, if it wants to enforce the use of DNS over secure channel, sends the DNS server security information (DNS configuration parameters) to the UE in response to the NAS message. The UE is then configured with the DNS configuration parameters. The DNS messages are now protected and exchanged with the network system.

Unlike existing methods and systems, the proposed method provides DNS message protection over application layer.

Referring now to the drawings, and more particularly to FIGS. 1A through 6, where similar reference characters denote corresponding features consistently throughout the figures, there are shown preferred embodiments.

Figure 1B:
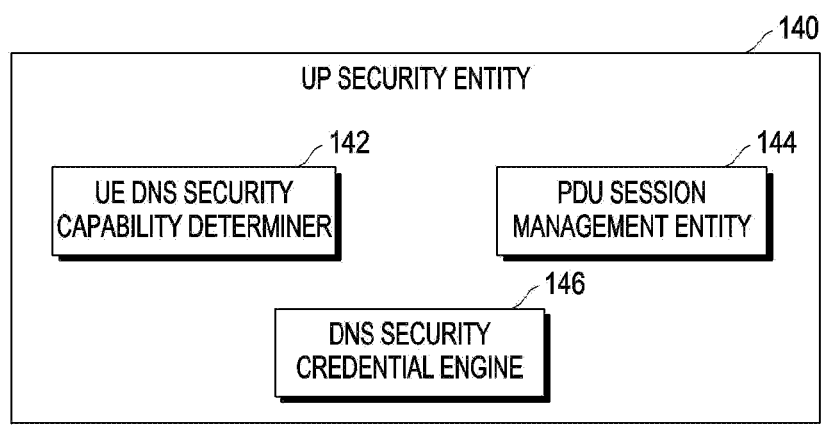
FIG. 1B illustrates a block diagram of a User Plane security entity, according to an embodiment as disclosed herein.

FIGS. 1A and 1B illustrate a block diagram of an UE (100) for protecting sensitive user plane traffic, according to an embodiment as disclosed herein. The UE (100) may be, for example, but not limited to, social robot, a smart watch, a cellular phone, a smart phone, a Personal Digital Assistant (PDA), a tablet computer, a laptop computer, a music player, a video player, an Internet of things (IoT) device, a smart speaker, an Artificial intelligent (AI) device or the like.

In an embodiment, the UE (100) includes a memory (110), a processor (120), a communicator (130), a UP security entity (140) and a transceiver (150).

The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). The memory (110) can be an internal storage unit or it can be an external storage unit of the UE (100), a cloud storage, or any other type of external storage.

In an embodiment, the processor (120) communicates with the memory (110), the communicator (130), and the UP security entity (140). The processor (120) is configured to execute instructions stored in the memory (110) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

In an embodiment, the communicator (130) is configured for communicating internally between internal hardware components and with external devices via one or more networks. The communicator (130) includes an electronic circuit specific to a standard that enables wired or wireless communication.

The UP security entity (140) is responsible for protecting Domain Name System (DNS) packets which are exchanged over the air by providing integrity protection to the DNS packets in order to avoid redirection attack. The UP security entity (140) protects DNS packets using DNS security credentials received from a network entity.

The UP security entity (140) is configured to determine that the UE (100) supports secure exchange of the DNS message with the DNS server if DNS configuration parameters are received. Further, the UE (100) informs the network system that the UE (100) supports secure exchange of the DNS message in a NAS message by including DNS server security information indicator. The UE (100) receives the DNS configuration parameters in response to the NAS message, if network wants to enforce the use of DNS over secure channel (for example, if the SMF wants to disable the integrity protection in the PDCP layer and enable DNS security at the application layer (DTLS/TLS/HTTPs)). The DNS message are protected by configuring the UE (100) with the DNS configuration parameters received from network. Finally the protected DNS packets are exchanged with the network system.

The UP security entity (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

Although the FIG. 1A shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function to protecting user plane traffic.

FIG. 1B illustrates a block diagram of UP security entity (140) for protecting user plane traffic, according to an embodiment as disclosed herein.

In an embodiment, the UP security entity (140) comprises a Protocol Data Unit (PDU) session management entity (144), a UE capability determiner (142) and a DNS credential engine (146).

In an embodiment, the UE capability determiner (142) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the UE capability determiner (142), determines that the UE (100) supports secure exchange of the DNS message during a NAS procedure in a NAS message, wherein the DNS message are exchanged using DNS configuration parameters provided by the network. In an embodiment, the NAS procedure may be a Registration procedure by the UE (100). In another embodiment, the NAS procedure may be a Packet Data Network (PDN) connectivity procedure. In another embodiment, the NAS procedure may be an Attach procedure. In yet another embodiment, the NAS procedure may be service request procedure. In yet another embodiment, the NAS procedure may be a Protocol Data Unit (PDU) establishment procedure. In another embodiment, the UE (100) may inform the network system during a UE Configuration update procedure.

Further, the UE capability determiner (142) informs the PDU session management entity (144) that the UE (100) supports secure exchange (for example, support for DNS over Datagram Transport Layer Security (DTLS) and/or DNS over Transport Layer Security (TLS) and/or DNS over Hypertext Transfer Protocol Secure (HTTPs)) of the DNS message.

In an embodiment, the PDU session management entity (144) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, during the PDU establishment procedure the UE (100) sends a PDU Session Establishment Request to connect to the network system. The PDU Session Establishment Request includes "Secure DNS Configuration Parameters Request (DNS server security information indicator)" as part of extended Protocol Configuration Options (PCO) information element (IE). The Secure DNS Configuration Parameters Request indicates to the network system that UE (100) is capable of secure DNS exchange functionality, and is willing to accept corresponding DNS Server configuration parameters.

Further, the PDU Session Establishment Request also informs the network system about secure channels which are supported by the UE (100). In an embodiment, the secure channel may be DNS over Datagram Transport Layer Security (DTLS). In another embodiment, the secure channel may be DNS over Transport Layer Security (TLS). In yet another embodiment, the secure channel may be DNS over Hypertext Transfer Protocol Secure (HTTPS).

In an embodiment, if the PDU Session Establishment Request is accepted by the network system, then the network system sends PDU Session Establishment Accept message to the UE (100). The PDU Session Establishment Accept message contains extended PCO information element which includes a container called "Secure DNS Configuration Parameters" comprising information mentioned in a DNS server security information.

The container "secure DNS configuration parameters" is sent to the DNS credential unit (146).

In another embodiment, the UE (100) informs the network system about its capability of secure DNS message exchange in a attach request message to the network system during the attach procedure. The UE (100) includes the "Secure DNS Configuration Parameters Request" as part of PCO (Protocol Configuration Options). The Secure DNS Configuration Parameters Request indicates to the network that UE is capable of exchanging DNS over secure channel such as for example, Transport layer security (TLS) and is willing to accept corresponding DNS Server configuration parameters.

The UE (100) receives a "Attach Complete" message from the network system in response to the attach request. The attach complete message contains PCO (Protocol configuration Options), which includes the container "Secure DNS Configuration Parameters" comprising of information mentioned in a DNS server security information.

In another embodiment, the UE (100) informs the network system about its capability of secure DNS message exchange in a PDN connectivity request to the network system during the PDN connectivity procedure. The UE (100) includes the "Secure DNS Configuration Parameters Request" as part of PCO (Protocol Configuration Options) in the PDN connectivity request. The Secure DNS Configuration Parameters Request indicates to the network that UE is capable of exchanging DNS over secure channel such as for example, Transport layer security (TLS) and is willing to accept corresponding DNS Server configuration parameters.

The UE (100) receives a "PDN connectivity accept" message from the network system in response to the attach request. The PDN connectivity accept message contains PCO (Protocol configuration Options), which includes the container "Secure DNS Configuration Parameters" comprising of information mentioned in a DNS server security information.

In another embodiment, the UE (100) informs the network system about its capability of secure DNS message exchange in a UE registration Request to the network system during the registration procedure. The UE (100) includes the "Secure DNS Configuration Parameters Request" as part of PCO (Protocol Configuration Options) in the registration request message. The Secure DNS Configuration Parameters Request indicates to the network system that UE is capable of exchanging DNS over secure channel such as for example, Transport layer security (TLS) and is willing to accept corresponding DNS Server configuration parameters.

The UE (100) receives DNS configuration parameters in the container in response to the registration request from the network system (200).

In the above embodiments, the UE (100) receives additional parameters from the network system (200) indicating whether a specific DNS configuration is valid over 5GS only or Evolved Packet System (EPS) only or both in EPS or 5GS. If the UE (100) receives an indication that default DNS configuration is valid over 5GS only then the UE (100) uses the default DNS configuration only when the UE (100) accessing 5GS. In this case, the network (200) or the UE (100) releases the related PDU session implicitly (without sending any session management message) or explicitly (initiating PDU session release procedure) during mobility from 5GS to EPS.

In another embodiment, if the UE (100) receives an indication that default DNS configuration is valid over EPS only then the UE (100) uses the default DNS configuration only when the UE (100) accessing EPS. In this case, the network (200) or the UE (100) releases the related PDN Connection implicitly (without sending any session management message) or explicitly (initiating Protocol Data Unit (PDU) session release procedure) during mobility from EPS to 5GS.

In yet another embodiment, if the UE receives an indication that default DNS configuration is valid for 5GS and EPS then the UE (100) uses the default DNS configuration when accessing both 5GS and EPS. The related PDU session continues in both EPS and 5GS, during mobility between 5GS or EPS.

In an embodiment, the DNS credential unit (146) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The DNS credential unit (146) determines information about the DNS server security information from the container, secure DNS configuration parameters. The container comprises at least one of the following: A DNS security mechanism information, DNS security credentials, DNS service port information, security profile, and supported server certificate type. The DNS security mechanism information determines whether it is DNS over HTTPS or DNS over TLS or DNS over DTLS. The DNS Security Credentials comprises root certificate of a certificate authority to be used for server certificate verification or Public key of the server to establish the TLS session without authentication, Subject Public Key Info (SPKI), and an authentication domain name. The DNS Service Port information indicates that the service port may be 53 or 853 or <administrator defined port>. The security profile information may indicate Strict Privacy profile or Opportunistic Privacy profile. The Supported Server certificate type may be RawPublicKey and/or X.509 and/or OpenPGP.

In an embodiment, the DNS over TLS supported server by default listens and accept Transmission Control Protocol (TCP) connections on port 853, unless it it\s communicated by the network to the UE (100) to use a port other than 853 for DNS over TLS.

Once the DNS configuration parameters are determined by the DNS credential unit (146), the UE (100) is configured with the DNS configuration parameters and the DNS messages are protected and exchanged with the DNS server through the PDU session.

Figure 2:
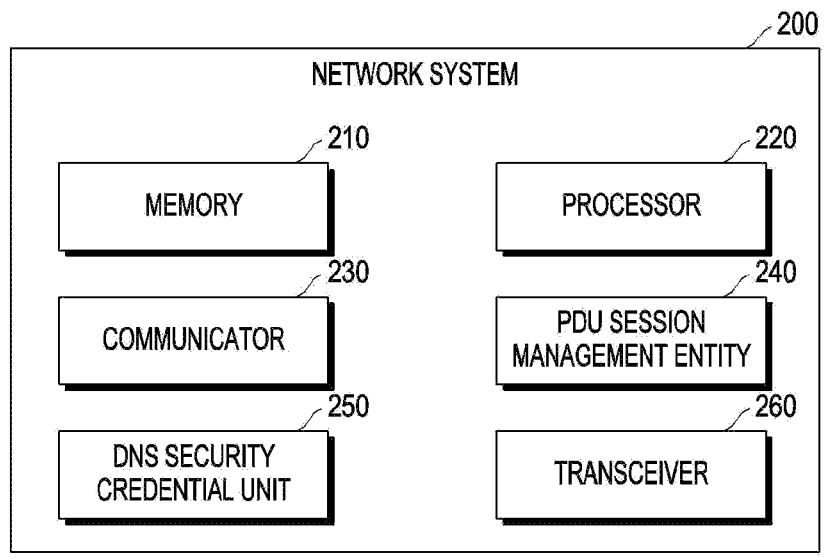
FIG. 2 illustrates a block diagram of a network system for protecting user plane (UP) traffic, according to an embodiment as disclosed herein.

FIG. 2 is a block diagram of the network system (200) communicating with the UE (100) for providing UP traffic protection, according to an embodiment as disclosed herein. The network (200) can be, for example, but not limited to an evolved node B (eNB), a next-generation radio access technology network Node B (gNB), an access and mobility management function (AMF), a session management function (SMF), a mobility management entity (MME), a user plane function (UPF) (203), a domain name system (DNS) server, and an application server, a data network or a $5^{th}$ Generation network.

As seen in FIG. 2, the network (200) comprises a memory (210), a processor (220), a communicator (230), a PDU session management entity (240), a DNS credential unit (250) and a transceiver (260).

The memory (210) stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory. In certain examples, a non-transitory storage medium may store data that can, over time, change (e.g., in Random Access Memory (RAM) or cache). The memory (210) can be an internal storage unit or it can be an external storage unit of the network system (200), a cloud storage, or any other type of external storage.

In an embodiment, the processor (220) communicates with the memory (210), the communicator (230), the DNS credential unit (250) and the PDU session management entity (240). The processor (220) is configured to execute instructions stored in the memory (210) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

In an embodiment, the communicator (230) is configured for communicating internally between internal hardware components and with external devices via one or more networks. The communicator (230) includes an electronic circuit specific to a standard that enables wired or wireless communication.

The PDU session management entity (240) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the PDU session management entity (240) receives a "PDU Session Establishment Request" from the UE (100) in order to connect to the network system (200). The PDU session establishment request includes "Secure DNS Configuration Parameters Request" as part of extended Protocol Configuration Options (PCO). This indicates that the UE (100) is capable of secure DNS functionality, and is willing to accept corresponding DNS Server configuration parameters in order to protect the DNS message exchanged between the network (200) and the UE (100).

The PDU session management entity (240) accepts the PDU Session Establishment Request received from the UE (100), and sends a "PDU Session Establishment Accept" message to the UE (100). The message contains PCO (Protocol configuration Options), which includes the container named "Secure DNS Configuration Parameters". The container comprises information mentioned in DNS server security information and is taken care by the DNS credential unit (250). The container is explained in detail in FIG. 4, as an illustrative example.

In an embodiment, the network system (200) send the "Attach Complete" message to the UE (100) in response to the attach request from the UE (100). The attach complete message contains PCO (Protocol configuration Options), which includes the container "Secure DNS Configuration Parameters" comprising of information mentioned in a DNS server security information.

In an embodiment, the network system (200) send the "PDN connectivity accept" message to the UE (100) in response to the PDN connectivity request. The PDN connectivity accept message contains PCO (Protocol configuration Options), which includes the container "Secure DNS Configuration Parameters" comprising of information mentioned in a DNS server security information.

In another embodiment, the network system (200) send the DNS configuration parameters in the container format in response to the registration request from the UE (100).

In an embodiment, during a UE (100) Configuration update procedure, the network system (200) may updates the DNS configuration in the UE (100) using UE (100) Configuration Update Procedure. When the network system (200) system determines that UE (100) needs to be configured with "Secure DNS Configuration Parameters", it includes the container "Secure DNS Configuration Parameters" in the UE (100) Configuration Update Command message to the UE (100).

In another embodiment, the network system (200) inform the UE (100) regarding a new DNS configuration. The network system (200) decides to change a default DNS configuration and then initiates mobility management (e.g. Network initiated service request procedure or Globally Unique Temporary ID (GUTI) relocation procedure) or network initiated session management procedure and sends the new DNS configuration during these procedures in the NAS message (e.g. Service Accept during network initiated service request procedure or in PDU session modification command or in PDU session release command or 5GSM status. When the UE (100) receives the new configuration, the UE (100) acknowledges the receipt of the new default DNS configuration by sending the NAS message. The UE (100) start using the new DNS configuration.

In the above embodiments, the network system (200) may send an additional parameter to the UE (100) indicating whether the default DNS configuration is valid over 5GS only or Evolved Packet System (EPS) only or both in EPS or 5GS.

The DNS security credential unit (250) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The DNS security credential unit (204) send the DNS configuration parameters to the UE (100) in form of the container.

The above described at least one of the plurality of modules/components may be implemented through an artificial intelligence (AI) model. A function associated with AI may be performed through memory 110 and the processor 120. The one or a plurality of processors controls the processing of the input data in accordance with a predefined operating rule or AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 2 shows various hardware components of the network system (200) is to be understood that other embodiments are not limited thereon. In other embodiments, the network system (200) may include less or more number of components. Further, the labels or names of the components are used only for illustrative purpose and does not limit the scope of the invention. One or more components can be combined together to perform same or substantially similar function to manage application launching.

Figure 3A:
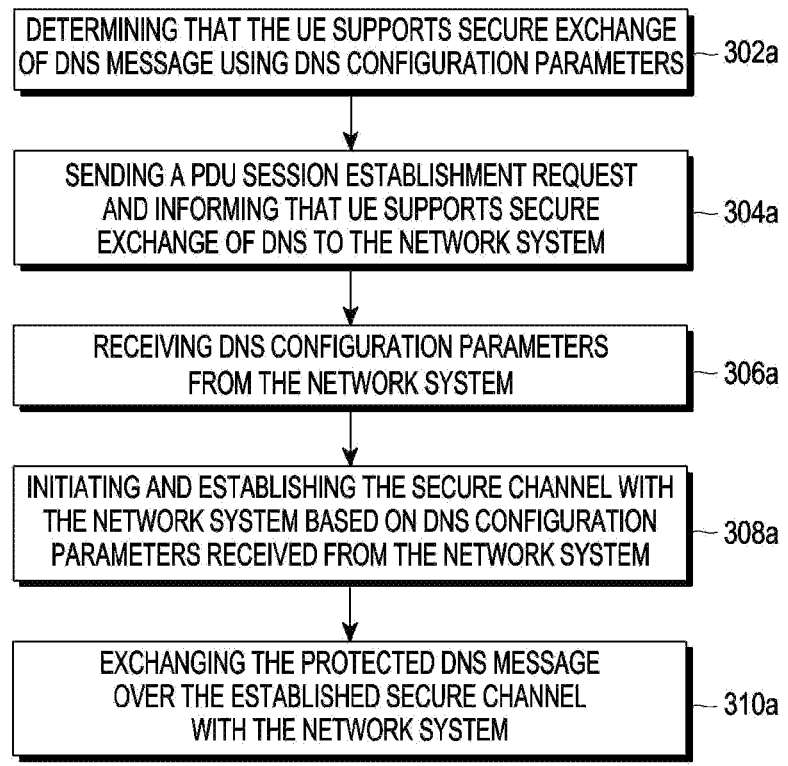
FIG. 3A is a flow diagram, illustrating a method of user plane traffic protection from the UE perspective, according to an embodiment as disclosed herein.

FIG. 3A is a flow diagram 300A illustrating a method for protecting UP traffic from UE (100) perspective according to an embodiment as disclosed herein.

At 302a, the UE (100) determines that the UE (100) is capable of secure exchange of DNS messages/packets if DNS configuration parameters are received from the network system (200).

At 304a, the UE (100) informs the network system (200) about the UE (100) capability of secure exchange of the DNS packets/messages in the NAS procedure. In an embodiment, the UE (100) informs the network system (200) by sending a first Non-Access-Stratum (NAS) message. Further, the UE (100) initiates a PDU session establishment request. The UE (100) sends a PDU session establishment request to the network system (200). The PDU Session Establishment Request includes "Secure DNS Configuration Parameters Request (DNS server security information indicator)" as part of Protocol Configuration Options (PCO) IE. The Secure DNS Configuration Parameters Request indicates to the network system that UE (100) is capable of secure DNS exchange functionality, and is willing to accept corresponding DNS Server configuration parameters. In an embodiment, the PDU session management entity (144) in the UE (100) initiates the PDU session.

At 306a, the UE (200) receives the PDU Session Establishment Accept message from the network system (200) if the PDU Session Establishment Request is accepted by the network system (200). In an embodiment, the accept message is a second NAS message in response to the first NAS message. The PDU Session Establishment Accept message contains PCO which includes a container called "Secure DNS Configuration Parameters" comprising information mentioned in a DNS server security information.

At 308a, the UE (100) is configured with the DNS configuration parameters for protecting the DNS message and the secure channel is established with the DNS server in the network.

At 310a, the protected DNS packets/messages are shared with the DNS server in the network system (200) over the established secure channel.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the invention.

FIG. 3B is a flow diagram 300B illustrating a method for protecting UP traffic from UE perspective according to an embodiment as disclosed herein.

At 302b, the network system (200) receives the dedicated PDU session establishment request from the UE (100). The PDU Session Establishment Request includes "Secure DNS Configuration Parameters Request" as part of Protocol Configuration Options (PCO). The network system (200) determines that the UE (100) is capable of secure exchange of the DNS messages/packets and is willing to accept corresponding DNS Server configuration parameters.

At 304b, the network system (200) sends the PDU Session Establishment Accept message to the UE (100) in response to the PDU session establishment request. The PDU Session Establishment Accept message contains PCO which includes a container called "Secure DNS Configuration Parameters" comprising information mentioned in a DNS server security information.

At 306b, the DNS server in the network establish the secure channel, if initiated by the UE. At 308b, the dedicated PDU session is established and the DNS packets are protected.

At 310b, the protected DNS packets/messages are exchanged with the UE (100).

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the invention.

FIG. 4 is a schematic diagram, illustrating an example of the container Secure DNS Configuration Parameters comprising the DNS security credentials, according to an embodiment as disclosed herein.

As seen the container includes the information about the different security mechanism. 402 indicates the DNS over HTTP channel. 404 indicates DNS over TLS channel. 406 indicates DNS over DTLS channel. Further 408 shows the DNS security port and the like. The container identifier contents field contains one of the parameters: security protocol type, port number, authentication domain name, SPKI pin sets, root certificate, raw public key. When there is a need to send more than one parameter, then multiple containers with the container identifier indicating DNS server security information are used, each containing one parameter. The first octet of container identifier contents of the DNS server security information with length of two octets contains the type and all octets excluding the first octet of the container identifier contents field of the DNS server security information with length of two octets contain the value part. If the DNS server security information with length of two octets contains security protocol type then the type is set to 0x00 and the value part is set to 0x00 if the security protocol type is TLS and 0x01 if the security protocol type is DTLS. If the DNS server security information with length of two octets contains port number then the type is set to 0x01 and the value part to content is set ephemeral port. If the DNS server security information with length of two octets contains authentication domain name then the type is set to 0x02 and the value part is set authentication domain name. If the DNS server security information with length of two octets contains SPKI pin set then the type is set to 0x03 and the value part is set SPKI pin set (The SPKI pin set shall be encoded as in DER as specified in X 690.3). If the DNS server security information with length of two octets contains a root certificate then the type is set to 0x04 and the value part is set the root certificate (the root certificate is encoded as in DER as specified in X 690). If the DNS server security information with length of two octets contains raw public key then the type is set to 0x05 and the value part is set to raw public key (The raw public key shall be encoded as in DER as specified in X 690.3).

Further, the container comprises the DNS security credentials, the DNS service port information, the security profile, and the supported server certificate type. The DNS security mechanism information determines whether it is DNS over HTTPS or DNS over TLS or DNS over DTLS. The DNS Security Credentials comprises root certificate of a certificate authority to be used for server certificate verification or Public key of the server to establish the TLS session without authentication, Subject Public Key Info (SPKI), and an authentication domain name. The DNS Service Port information indicates that the service port may be 53 or 853 or <administrator defined port>. The security profile information may indicate Strict Privacy profile or Opportunistic Privacy profile. The Supported Server certificate type may be RawPublicKey and/or X.509 and/or OpenPGP.

Figure 5:
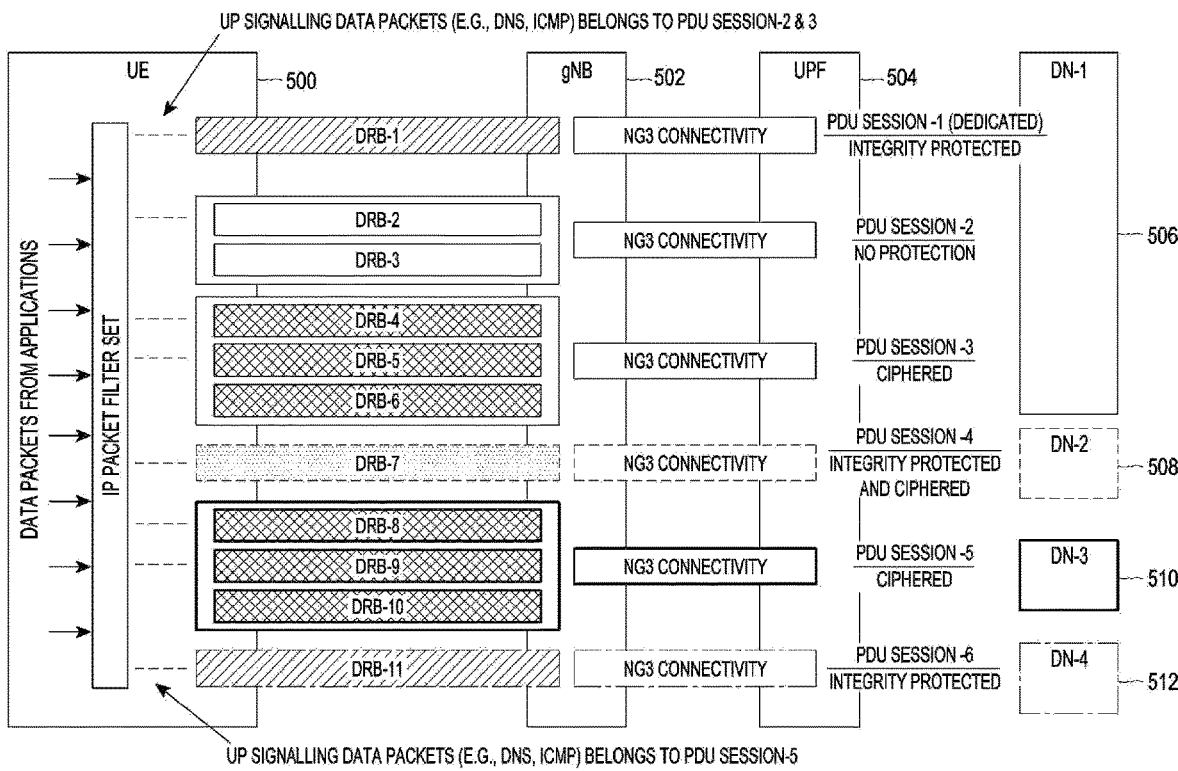
FIG. 5 is a schematic diagram, illustrating Establishment and routing of data packets from applications to the appropriate established PDU sessions using IP Packet Filter Se, according to an embodiment as disclosed herein.

FIG. 5 is a schematic diagram illustrating an example of establishment and routing of data packets from applications to the appropriate established PDU sessions using IP packet filter set, according to the embodiments as disclosed herein.

Referring to the FIG. 5 example, a UE (500) is connected to a serving network. Wherein the serving network may an AMF or a SMF or a URSP. The serving network is aware that for some of the DNN(s) or Application(s), the network policy is not to activate an encryption and/or integrity protection for the PDU session. Such network Policy may be based on a subscribed UP Security Policy and/or a User Plane Security Policy locally configured per DNN, Single Network Slice Selection Assistance (S-NSSAI) in the SMF and/or the maximum supported data rate per UE for integrity protection for the DRBs and/or the DNS server does not support secure channel. In here the serving network configures the UE (500) with a UE Route Selection Policy (URSP) rules such that, two PDU sessions (DNN1 and DNN2) need to be established. In one PDU session security is activated or deactivated based on the User Plane security policies from the serving network and other (say, DNN2) with integrity protection and with/without encryption (User Plane security policies from SMF, indicates UP integrity protection is "Required" for all the traffic on the PDU Session UP integrity protection shall apply) with filter information on what application data should pass the PDU session established for the DNN (DNN2, special DNN).

PCF (H-PCF and/or V-PCF) triggers the UE (500) Configuration Update Procedure as specified in Technical Specification 23.502 to sends the UE (500) policy container including UE access selection and PDU Session selection related policy information to the UE (500). The policy container includes the URSP rules, to indicate that for a particular application or particular DNN or particular S-NSSAI, in addition to the normal PDU session(s) (for which security (encryption and/or integrity Protection) may not be activated (based on User Plane security policies)), a dedicated PDU session needs to be established (additional/special DNN). The dedicated PDU session shall activate the protection of the PDU session to protect (encryption and/or integrity Protection) of sensitive user plane traffic (for example, DNS, ICMP, SIP, like so), that is the User Plane security policies from SMF, indicates UP integrity protection is "Required" for all the traffic on the PDU Session UP integrity protection shall apply. Application (may be unaware of DNN) in the UE (500), whenever request for PDU session, then the UE(500) use the URSP and identify that, for the request (DNN Type IPv4 in eMBB slice) it matches with two DNNs and the UE (500) initiates two requests for establishment of PDU Sessions with the network by including DNN1 and DNN2 (in sequence).

Once the PDU sessions are established (based on the User Plane Security Enforcement information provides the NG-RAN with User Plane security policies for a PDU session and NG-RAN configures the security of the DRB(s) of the PDU session based on the received policy), the IP packet filter set takes care of identifying the appropriate PDU session and route the application packets, so that appropriate configured security mechanisms are applied. The IP Packet Filter Set use at least any 10 combination to identify appropriate PDU session. For IP PDU Session Type, the Packet Filter Set shall support Packet Filters based on:— Source/destination IP address or IPv6 prefix. Source/destination port number. Protocol ID of the protocol above IP/Next header type. Type of Service (TOS) (IPv4)/Traffic class (IPv6) and Mask. Flow Label (IPv6). Security parameter index. Packet Filter direction. For illustration purpose, in the FIG. 5, the PDU sessions #1, #2, #3 belongs to S-NSSAI-1, PDU sessions #4 belongs to S-NSSAI-2, and PDU sessions #5 and #6 belongs to S-NSSAI-3.

In an embodiment a method is provided to avoid possible man in the middle attacks of DNS server queries. Since consistent and repeated man-in-the-middle attacks are difficult, an alternate approach to ensure that the UE does not end up acting on a DNS message that has been modified is by triggering back to back repeated DNS queries. The number of such repetitions can be based on implementation. Every response is saved and after the end of the attempts the application can pick the response that has repeated itself the most. For example, the UE/application can be configured to trigger 5 attempts of DNS query for the first time after the connection to 10 the PDN/DNN. The server address received in the response can be saved for all the 5 attempts. The server address that repeats itself the most can be taken to be the right address received from the DNS server. This ensures that even if there have been attacks on a couple of the DNS responses, the UE is able to ignore the same and use the contents of the unaltered response 15 from the actual DNS server.

The re-attempts can be restricted to only the DNS query that goes out the first time after the PDN/PDU session is established. The spacing of the successive DNS queries and the number of attempts can be left to implementation.

In an embodiment, the network (for example, the gNB/eNB/PGW/UPF) can identify the inappropriate TTL value (for example, other than 64/128/255 and 63/127/254 in case of tethering) from the UE on the User Plane traffic (may be for particular protocols like, DNS, ICMP, SIP) and discard the packet suspecting it as the manipulated packet 5 (as the EPS/5GS is the first hop to receive the packets from the UE).

In an embodiment, the UE (500) (may be based on configuration) always send 2 DNS requests for the same query, to the primary DNS server and to the secondary DNS server. So that attackers guess might go wrong.

In an embodiment, the UE instead (500) of using standard configured value for the TTL, it uses randomized value between a range (for example, between 64 to 255). So that any manipulation on the destination IP addresses and compensating using the TTL is not possible.

In an embodiment, the gateway function in operator network (e.g. PGW or UPF) can rewrite and randomize IP-Identification field in the downlink IP-packets, if they are not fragmented. This way, any manipulation on the destination IP address and compensating using the IP-Identification field is not possible.

In an embodiment, the gateway function in operator network (e.g. PGW or UPF) can compute and re-write the UDP checksum of downlink DNS packets. This way, any manipulation on the destination IP address will make UDP checksum invalid, and receiving UE (500) will drop the packet, thus making the attack ineffective.

Figure 6:
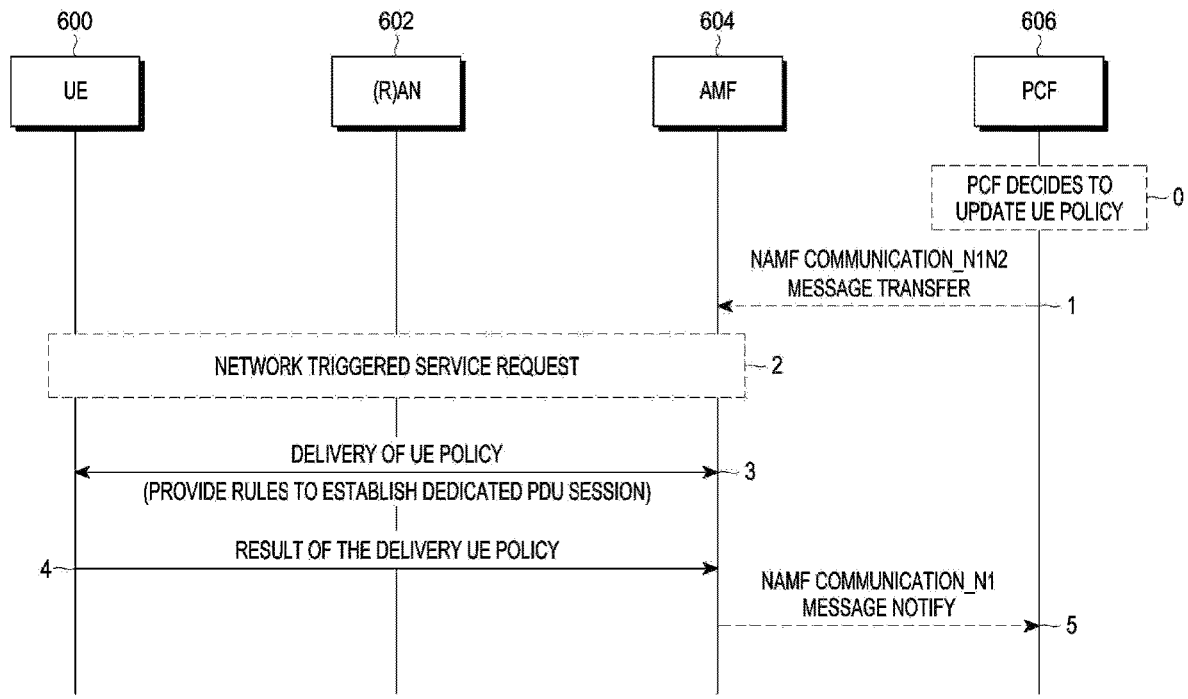
FIG. 6 is a sequence diagram, illustrating a UE configuration update procedure, according to an embodiment as disclosed herein.

FIG. 6 is a sequence diagram, illustrating a sequence for UE configuration update procedure, according to an embodiment as disclosed herein.

As seen in FIG. 6, the UE (600) is in communication with a Policy Control Function PCF (606), and an Access and Mobility Management Function (AMF) (604) over a Radio Access Network (RAN) (602) the PCF decides to update the UE policy.

At 0, the PCF (608) decides to change the UE (600) policy. At 1, the PCF (608), sends a "Namf communication_N1N2 message transfer" to the AMF (604). At 2 the network triggers a service request. At 3 the UE policy is delivered to the UE (600), the AMF (604) and the RAN (602). At 4 results of the delivery of the UE policy is shared with the AMF (604) and the RAN (602). At 5 "Namf communication_N1 message notify" is shared with the PCF (608).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method of a user equipment (UE), the method comprising:
    transmitting, to a network entity, a protocol data unit (PDU) session establishment request message including an indicator indicating that the UE supports of domain name system (DNS) over transport layer security (TLS) or DNS over datagram TLS (DTLS); and
    receiving, from the network entity, a PDU session establishment accept message including DNS server security information in response to transmitting the PDU session establishment request message,
    wherein the DNS server security information comprises information on a security mechanism.

2. The method of claim 1, wherein the indicator is included in protocol configuration options in the PDU session establishment request message.

3. The method of claim 1, wherein the DNS server security information is included in protocol configuration options in the PDU session establishment accept message.

4. The method of claim 1, wherein the DNS server security information comprises at least one of information on a service port, information on an authentication domain name, information on subject public key (SPKI), information on root certificate, and information on a raw public key.

5. A method of a network entity, the method comprising:
    receiving, from a user equipment (UE), a protocol data unit (PDU) session establishment request message including an indicator indicating that the UE supports of domain name system (DNS) over transport layer security (TLS) or DNS over datagram TLS (DTLS); and
    transmitting, to the UE, a PDU session establishment accept message including DNS server security information in response to receiving the PDU session establishment request message,
    wherein the DNS server security information comprises information on a security mechanism.

6. The method of claim 5, wherein the indicator is included in protocol configuration options in the PDU session establishment request message.

7. The method of claim 5, wherein the DNS server security information is included in protocol configuration options in the PDU session establishment accept message.

8. The method of claim 5, wherein the DNS server security information comprises at least one of information on a service port, information on an authentication domain name, information on subject public key (SPKI), information on root certificate, and information on a raw public key.

9. A user equipment (UE), the UE comprising:
    a transceiver; and
    a controller coupled with the transceiver and configured to control to:
        transmit, to a network entity, a protocol data unit (PDU) session establishment request message including an indicator indicating that the UE supports of domain name system (DNS) over transport layer security (TLS) or DNS over datagram TLS (DTLS), and
        receive, from the network entity, a PDU session establishment accept message including DNS server security information in response to transmitting the PDU session establishment request message,
    wherein the DNS server security information comprises information on a security mechanism.

10. The UE of claim 9, wherein the indicator is included in protocol configuration options in the PDU session establishment request message.

11. The UE of claim 9, wherein the DNS server security information is included in protocol configuration options in the PDU session establishment accept message.

12. The UE of claim 9, wherein the DNS server security information comprises at least one of information on a service port, information on an authentication domain name, information on subject public key (SPKI), information on root certificate, and information on a raw public key.

13. A network entity, the network entity comprising:
    a transceiver; and
    a controller coupled with the transceiver and configured to control to:
        receive, from a user equipment (UE), a protocol data unit (PDU) session establishment request message including an indicator indicating that the UE supports of domain name system (DNS) over transport layer security (TLS) or DNS over datagram TLS (DTLS), and
        transmit, to the UE, a PDU session establishment accept message including DNS server security information in response to receiving the PDU session establishment request message,
    wherein the DNS server security information comprises information on a security mechanism.

14. The network entity of claim 13, wherein the indicator is included in protocol configuration options in the PDU session establishment request message.

15. The network entity of claim 13, wherein the DNS server security information is included in protocol configuration options in the PDU session establishment accept message.

16. The network entity of claim 13, wherein the DNS server security information comprises at least one of information on a service port, information on an authentication domain name, information on subject public key (SPKI), information on root certificate, and information on a raw public key.

* * * * *